United States Patent
Benito-Navazo

(12) 
(10) Patent No.: US 6,188,018 B1
(45) Date of Patent: Feb. 13, 2001

(54) DEVICE FOR ADAPTING AN ELECTRICAL APPARATUS TO A RACEWAY

(75) Inventor: Juan Manuel Benito-Navazo, Sant Cugat Del Valles (ES)

(73) Assignee: Aparellaje Electrico, S.A., Barcelona (ES)

(*) Notice: Under 35 U.S.C. 154(b), the term of this patent shall be extended for 0 days.

(21) Appl. No.: 09/333,518

(22) Filed: Jun. 15, 1999

(51) Int. Cl.[7] .................................................. H02G 13/00
(52) U.S. Cl. ............................................ 174/48; 220/3.92
(58) Field of Search ................................ 174/48, 49, 50; 220/3.92, 3.94, 4.02; 52/220.5, 220.7

(56) References Cited

U.S. PATENT DOCUMENTS

| | | | |
|---|---|---|---|
| 5,300,731 | * | 4/1994 | DeBaratolo, Jr. et al. ............ 174/48 |
| 5,614,695 | * | 3/1997 | Benito Navazo ...................... 174/48 |
| 5,747,733 | * | 5/1998 | Woods et al. ......................... 174/48 |
| 5,834,692 | * | 11/1998 | Lentz ............................... 220/3.94 X |
| 5,861,576 | * | 1/1999 | Langston et al. ..................... 174/48 |
| 5,998,732 | * | 12/1999 | Caveney et al. ...................... 174/48 |

FOREIGN PATENT DOCUMENTS

| | | |
|---|---|---|
| 4432669C1 | 1/1996 | (DE) . |
| 2488064 | 2/1982 | (FR) . |
| 2610779 | 8/1988 | (FR) . |

* cited by examiner

Primary Examiner—Dean A. Reichard

(57) ABSTRACT

The device comprises: [a] a base member having a lower plate; an upper plate; a transverse wall extending between both plates; two first side walls, with a front portion attached to the lower plate and a rear portion associated with the upper plate and capable of being separated therefrom; and windows located in the upper plate and removable therefrom; and [b] a cover member having a front embouchure portion; a rear covering portion; second side walls and a rear wall. The cover member and the base member may be coupled together, defining an embouchure for communicating with an opening of an electrical apparatus; the removal of the rear portions of the first side walls opens a space in which a portion of a base section of a raceway containing electrical conductors may be housed.

7 Claims, 3 Drawing Sheets

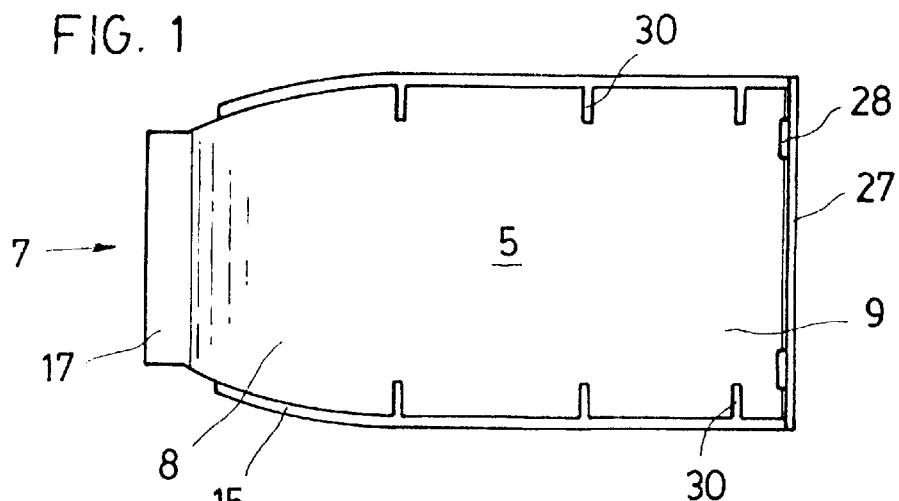
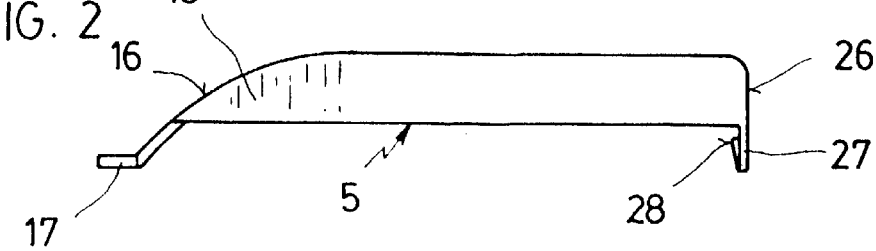
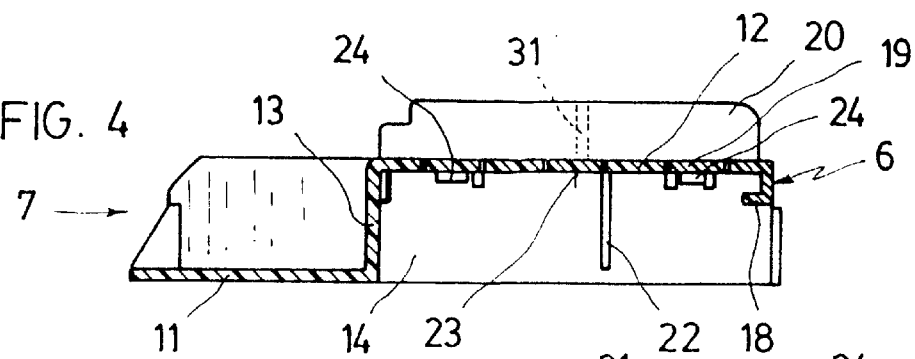
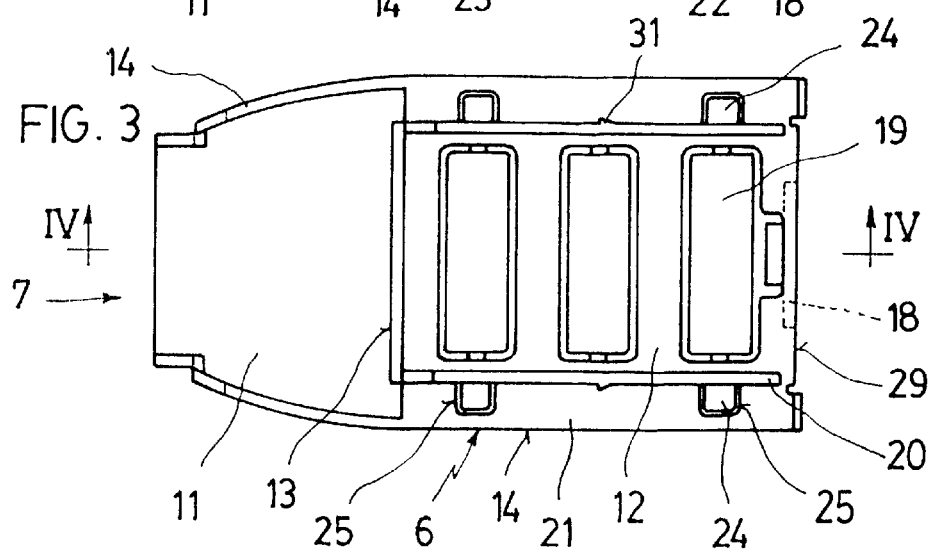

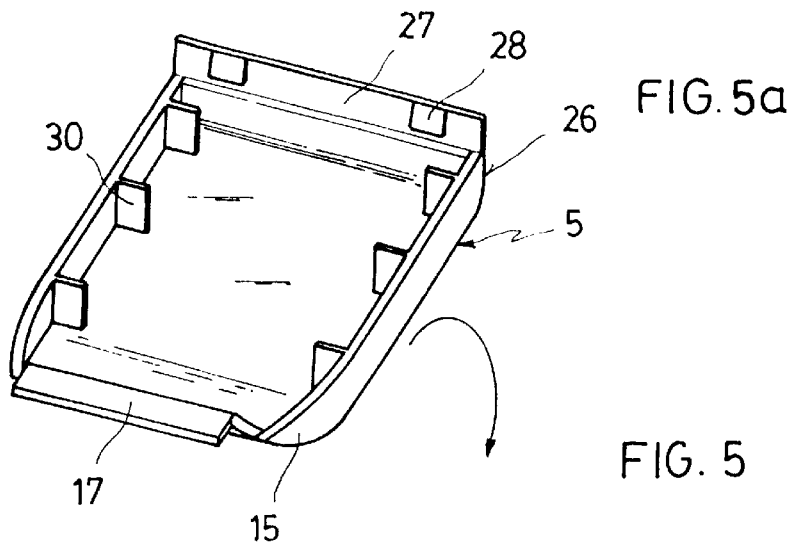
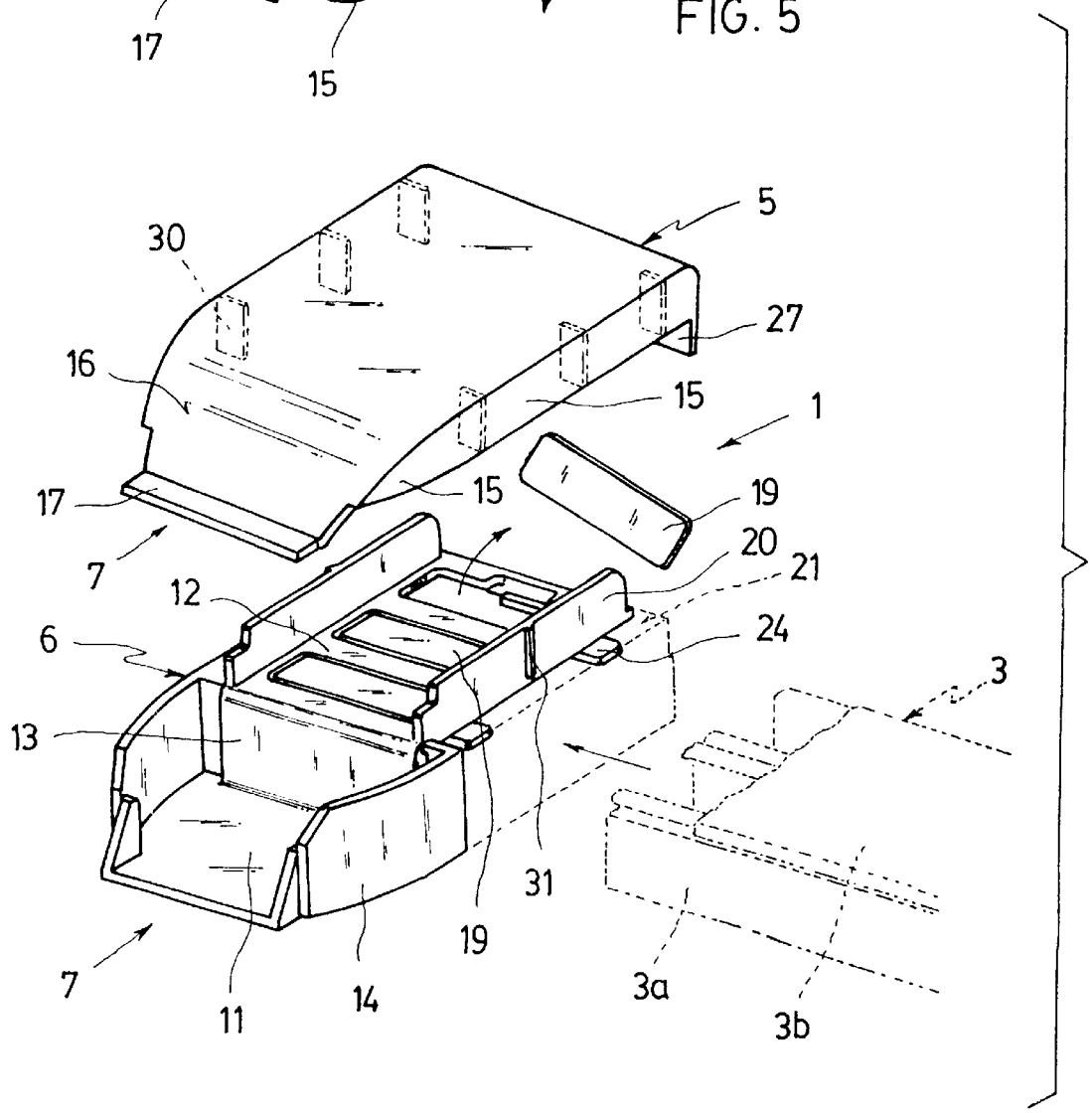

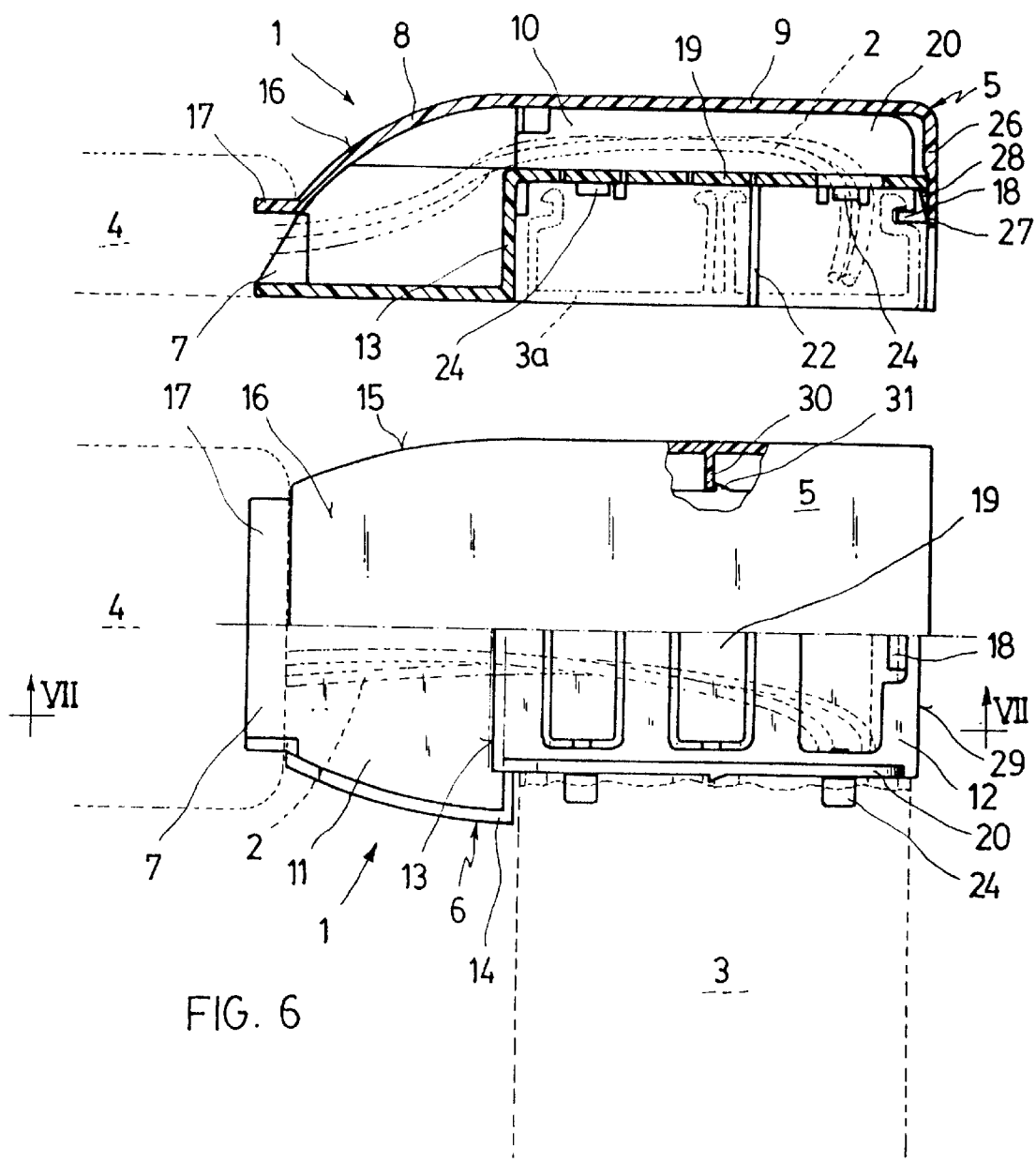

DEVICE FOR ADAPTING AN ELECTRICAL APPARATUS TO A RACEWAY

BACKGROUND AND SUMMARY OF THE INVENTION

The invention relates to a device for adapting an electrical apparatus to a raceway, said electrical apparatus having an opening and being provided with binding posts; and said raceway comprising a base section and a cover section and being for housing electrical conductors.

In electrical installations formed by moulding type raceways, i.e., those formed by the association of a base section and a cover section which have such a small height and width that they do not allow a conventional type electrical apparatus to be housed in the interior thereof, the recourse is to locate said electrical apparatus either at one side or at one end of the raceway. To such end, the device disclosed in Spanish Utility Model 9001306, in which it is necessary to form an opening in the base section of the raceway, and the device disclosed in Spanish Patent 9301500, which allows the connection to be made without it being necessary to form an opening in the base section of the raceway, are known, among others.

However, such devices have the drawback of being applicable only for electrical apparatus of conventional height and are not appropriate for apparatus of small height.

It is an object of the invention to overcome the above drawbacks. This object is achieved with a device of the type first mentioned above, which is characterized in that it comprises: a base member having: [i] a lower embouchure plate; [ii] an upper plate defining two longitudinal edges; [iii] a transverse wall extending between both plates; [iv] two first side walls, each of which is provided with a front portion extending upwardly from said lower plate and a rear portion extending downwardly from said upper plate; there being a weakening line in the immediate proximity of said longitudinal edges of said upper plate, said weakening line being for facilitating a separation of said rear portions of said first side walls; and [v] at least one window formed in said upper plate and for being removed from said upper plate; and a cover member having a front embouchure portion; and a rear covering portion defining second side walls and a rear wall; said cover member and said base member being adapted to enter into mutual engagement, in which state they define an embouchure for communicating with said opening of said electrical apparatus; and in that said removal of said rear portions of said first side walls opens a space for housing a portion of said base section of said raceway.

To facilitate an understanding of the foregoing ideas, a description is made hereinafter of one embodiment of the invention, with reference to the accompanying illustrative drawings, in which:

BRIEF DESCRIPTION OF THE DRAWINGS

FIG. 1 is a lower plan view of the cover member of the adapter according to the invention;

FIG. 2 is a side elevation view of the cover member of the previous figure;

FIG. 3 is a top plan view of the base member of the adapter;

FIG. 4 is a cross section view on the line IV—IV of FIG. 3;

FIG. 5 is an exploded perspective view of the base and cover members, in which a first side wall of the base member has been removed to allow for the insertion of the end of a raceway, illustrated in phantom line;

FIG. 5a is a perspective view of the cover member;

FIG. 6 is a plan view of the adapter formed by the base and cover members, in which one longitudinal half of the cover member has been omitted and from which a portion corresponding to one of the internal tabs thereof has been removed; a raceway and a low height electrical apparatus have been shown in phantom line;

FIG. 7 is a cross section view on the line VII—VII of FIG. 6;

DESCRIPTION OF THE PREFERRED EMBODIMENT

The adapter device 1 of the invention allows the electrical conductors 2 (FIG. 7) of a moulding type raceway 3 (FIGS. 6 and 7) to be connected to a low height electrical apparatus 4, without having to make openings in the base section 3a of the raceway 3, it being necessary only to cut the cover section 3b of the latter.

The adapter 1 is formed by the association of a cover member 5 (FIGS. 1 and 2) with a base member 6 (FIGS. 3 and 4), as may be seen in FIGS. 6 and 7.

The engagement of the base and cover members 6 and 5 defines a substantially rectangular embouchure 7 (FIGS. 6 and 7) which engages, in turn, a not shown opening formed in the electrical apparatus 4 and forms a guide way for the electrical conductors 2 which extend from the raceway 3 to the binding posts (not shown) of the electrical apparatus 4.

The cover member 5 comprises a front embouchure portion 8 and a rear covering portion 9, of the shape shown in FIG. 5. The member 5 engages the base member 6, defining a space 10 for inserting the electrical conductors 2 and allowing the conductors 2 to accede to the electrical apparatus 4 through the embouchure 7.

The base member 6, as shown in FIGS. 3 and 4, has a lower embouchure plate 11 which is flat and which, in the position of use, may be disposed coplanar with the lower surface of the electrical apparatus 4 and of the raceway 3, it is also provided with an upper plate 12 which in the said position of use may be seated on the base section 3a of the raceway 3. The lower plate 11 and the upper plate 12 form an internal step defining a smooth transverse wall 13 extending between both plates 11, 12 and forming an inner boundary for the lower plate 11.

The lower embouchure plate 11 of the base member 6 and the front embouchure portion 8 of the cover member 5 taper to form the embouchure 7, with a converging and, preferably, curvilinear configuration of the first side walls 14 of the base member and the second side walls 15 of the cover member. Preferably, the upper surface 16 of the front embouchure portion 8 of the cover member 5 curves towards the embouchure and has an overhanging transverse flange 17, which extends forwardly and transversely of the front portion 8 and forms the upper part of the embouchure.

Each of the two first side walls 14 of the base member 6 is provided with a front portion extending from the lower plate 11 and a rear portion extending downwardly from the upper plate. The rear portions may be removed, which allows the base member 6 to be engaged over the raceway 3, as shown in FIGS. 5, 6 and 7. Further reference will be made to this removal.

The upper plate 12 is also provided with an inwardly directed tab 18 which may act as a retaining means, by engagement in a groove of the base section 3a in which the cover section 3b of the raceway 3 engages. It is also provided with windows 19 which may be removed from the upper plate. This removal allows the electrical conductors 2 to pass through towards the cover member 5, as shown in FIG. 7.

In the proximity of the opposite ends of the windows 19 there are narrow longitudinal walls 20 defining a step 21. There is also a weakening line to facilitate removal of the rear portions of the first walls 14. This removal has been mentioned above and is facilitated by the existence of respective weakening lines placed immediately adjacent each of the longitudinal edges of the upper plate.

Each of the weakening lines is preferably located on the inside corner of the angle formed by the narrow walls 20 and the step 21 and this provides for removal of the side walls 14 together with the step 21. There are reinforcing gussets 22 which help to ensure that removal takes place along the said weakening lines.

Furthermore, the upper plate 12 of the base member 6, under each of the longitudinal edges of the upper plate 12 and therefore at a level below that of the lower surface 23 thereof, is provided with lugs 24. Each lug 24 corresponds to windows 25 open in the steps 21. After removal of the side walls 14 and the steps 21, the lugs 24 are left overhanging at a level allowing them to be inserted below the cover section 3b of the raceway, helping to hold the adapter 1 in place.

The rear portion 9 of the cover member 5 is provided with a rear wall 26 extending downwardly to form a transverse skirt 27 having barbs 28, for engagement with the rear edge 29 of the upper plate 12 of the base member 6. When the cover member 5 is engaged with the base member 6, the inwardly directed tab 18 is comprised between these barbs 28.

The rear covering portion 9 of the cover member 5 is provided on the inner surface of the side walls 15 thereof with transversely directed tabs 30 normal to the walls 15, each tab of one of the side walls 15 being opposite to a tab of the other side wall 15. These tabs help to increase the rigidity of the cover member 5. One pair of mutually opposite tabs 30 form longitudinal retaining means for the base member 6 in co-operation with barb-shaped ribs 31 arranged transversely on the narrow longitudinal walls 20 of the base member 6, as shown in the detail in cross section of FIG. 6.

What I claim is:

1. A device for adapting an electrical apparatus to a raceway, said electrical apparatus (4) having an opening and being provided with binding posts; and said raceway (3) comprising a base section (3a) and a cover section (3b) and being for housing electrical conductors (2), characterized in that it comprises:

a base member (6) having: a lower embouchure plate (11); an upper plate (12) defining two longitudinal edges; a transverse wall (13) extending between both plates (11, 12); two first side walls (14), each of which is provided with a front portion extending upwardly from said lower plate (11) and a rear portion extending downwardly from said upper plate (12); there being a weakening line in the immediate proximity of said longitudinal edges of said upper plate (12), said weakening line being for facilitating the separation of said rear portions of said first side walls (14); and at least one window (19) formed in said upper plate (12) and for being removed from said upper plate (12); and a cover member (5) having a front embouchure portion (8) and a rear covering portion (9) defining second side walls (15) and a rear wall (26); said cover member (5) and said base member (6) being adapted to enter into mutual engagement, in which state they define an embouchure for communicating with said opening of said electrical apparatus (4);

and in that said removal of said rear portions of said first side walls (14) opens a space for housing a portion of said base section (3a) of said raceway (3).

2. The device of claim 1, characterized in that said lower embouchure plate (11) has a progressive reduction of the transverse dimension thereof in the direction away from said upper plate (12); and said front embouchure portion (8) of said cover member (5) also has a progressive reduction of the transverse dimension thereof in the direction away from said rear covering portion (9).

3. The device of claim 1, characterized in that two longitudinal walls (20), between which said windows (19) are comprised, extend upwardly from said upper plate (12) of said base member (6), each of said walls having at least one barb-shaped rib (31).

4. The device of claim 1, characterized in that immediately below each of said longitudinal edges of said upper plate (12) of said base member (6) there are at least two lugs (24) which are left overhanging from said upper plate (12) when said rear portions of said first side walls (14) are removed; said lugs being appropriate for insertion below said cover section (3b) of said raceway (3) in said overhanging position.

5. The device of claim 1, characterized in that said rear wall (26) of said rear covering portion (9) of said cover member (5) is extended downwardly by a transverse skirt (27) provided with barbs (28) for engagement with said upper plate (12) of said base member (6).

6. The device of claim 3, characterized in that each of said second side walls (15) is provided with internal tabs (30) arranged normal to said second side walls (15); said barb-shaped ribs (31) being for engagement with said internal tabs (30).

7. The device of claim 1, characterized in that it is provided with an overhanging flange (17) which extends forwardly and transversely from said front embouchure portion (8) of said cover member (5); said overhanging flange (17) being substantially parallel to said lower plate (11) in a position of mutual engagement of the said cover member (5) with said base member (6).

* * * * *